United States Patent [19]
Faulds

[11] Patent Number: 5,238,160
[45] Date of Patent: Aug. 24, 1993

[54] RECEPTACLE AND CO-OPERATIVE CARRIER THEREFOR

[76] Inventor: Kevin M. Faulds, 1137 Moselle Crescent, Orleans, Canada, K1C 2S8

[21] Appl. No.: 691,616

[22] Filed: Apr. 25, 1991

[51] Int. Cl.$^5$ .............................................. B62J 11/00
[52] U.S. Cl. .................................. 224/32 R; 220/480;
220/737; 248/312.1; 215/1 C; 269/135;
269/900
[58] Field of Search .................... 224/32 R, 35, 37, 39;
220/480, 481, DIG. 13, 737, 740; 211/74, 89;
248/311.2, 312.1, 313, 305; 215/1 C, 100 A;
280/288.4; 269/47, 126, 135, 155, 156, 254 R,
900; 226/30 R, 148; 141/337, 331

[56] References Cited

U.S. PATENT DOCUMENTS

| | | | |
|---|---|---|---|
| 2,703,253 | 3/1955 | Biederman | 211/74 X |
| 3,212,661 | 10/1965 | Adell | 248/313 |
| 3,225,951 | 12/1965 | Poston et al. | 220/480 X |
| 3,533,526 | 10/1970 | Adell | 248/313 |
| 3,814,293 | 6/1974 | Daves | 211/74 X |
| 4,050,584 | 9/1977 | Lino | 211/76 |
| 4,386,721 | 6/1983 | Shimano | 224/39 |
| 4,441,638 | 4/1984 | Shimano | 224/35 |
| 4,534,465 | 8/1985 | Rothermel et al. | 211/74 X |
| 4,789,017 | 12/1988 | Parasewicz et al. | 141/337 X |
| 4,804,097 | 2/1989 | Alberghini et al. | 215/100 A |
| 4,807,421 | 2/1989 | Araki et al. | 269/254 R X |
| 4,875,652 | 10/1989 | Bosse et al. | 220/481 X |
| 5,040,709 | 8/1991 | Neugent | 224/35 |
| 5,052,567 | 10/1991 | Colani | 215/100 A |
| 5,115,952 | 5/1992 | Jenkins | 224/35 X |

FOREIGN PATENT DOCUMENTS

| | | |
|---|---|---|
| 0160372 | 11/1985 | European Pat. Off. |
| 595703 | 4/1934 | Fed. Rep. of Germany |
| 1064372 | 5/1954 | France |
| 7400841 | 8/1974 | France |
| 2284298 | 4/1976 | France .................. 248/313 |
| 8104306 | 9/1982 | France |
| 528056 | 10/1940 | United Kingdom ............... 220/480 |

Primary Examiner—Henry J. Recla
Assistant Examiner—Glenn T. Barrett
Attorney, Agent, or Firm—Dennis H. Lambert

[57] ABSTRACT

A novel combination unit of a novel receptacle and a novel mount is provided herein. The novel mount includes a base for securement to a selected surface. The base includes a support arm (e.g. which is centrally located) projecting from the base. Co-operative gripping means, e.g. laterally-spaced-apart members, are provided, as well as an upper, pivotally mounted, resiliently-sprung, e.g. spring biased closure. Alternately, a fixed angular closure surface fitted with a resilient closure block may be provided. The receptacle is provided with an internal pocket which is adapted to mate with the support arm, e.g. a central pocket. It is also co-operative grippable, e.g. laterally-spaced grippable depressions. A dispensing opening in the receptacle is adapted to be sealed automatically upon fitment of the receptacle with respect to the mount by actuated pivoting of the closure with respect to the mount or by contact with the fixed angularly-upwardly-projecting closure surface.

25 Claims, 13 Drawing Sheets

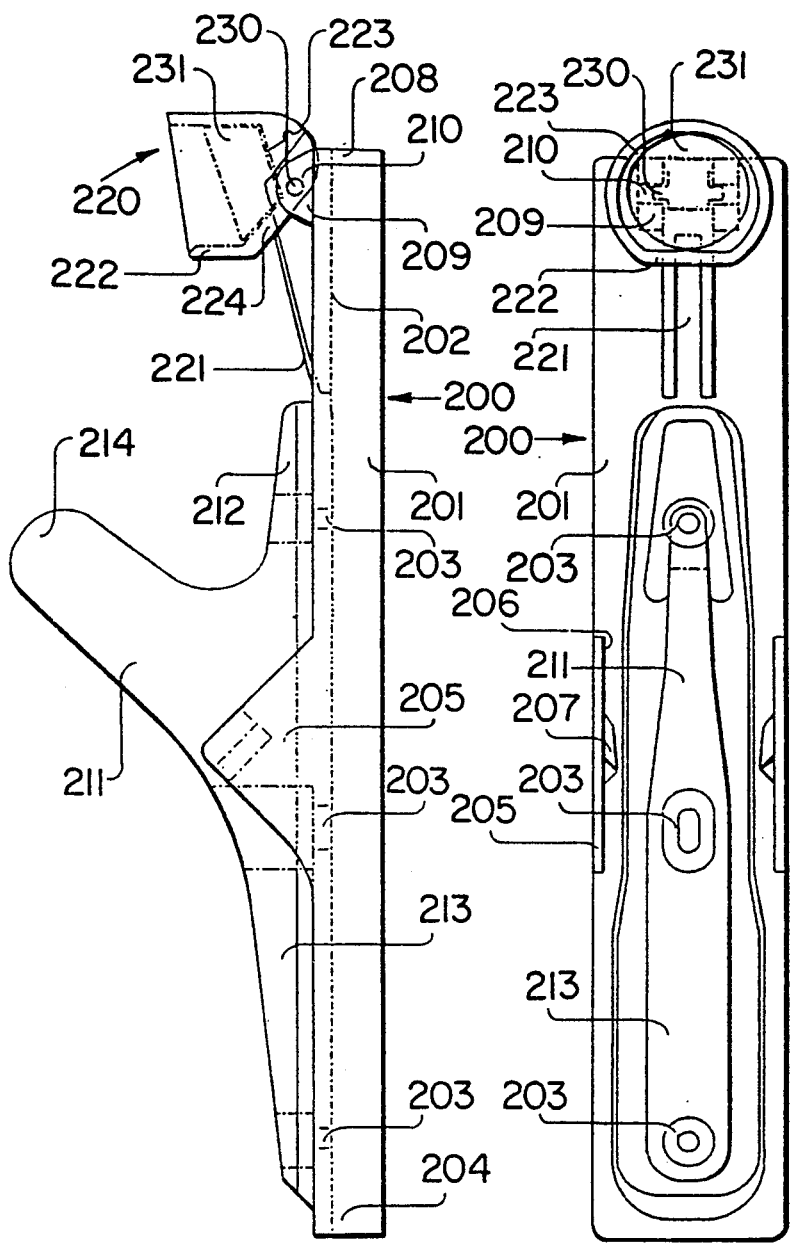
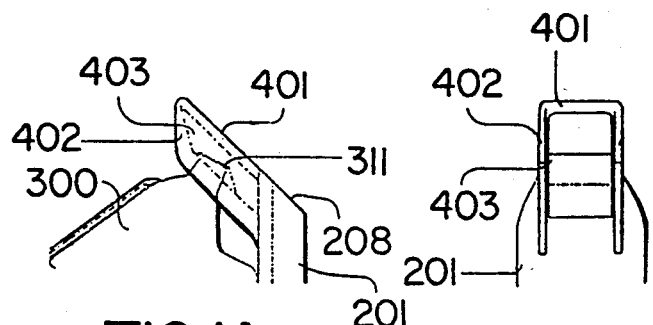
FIG.1  FIG.2  FIG.1A  FIG.2A

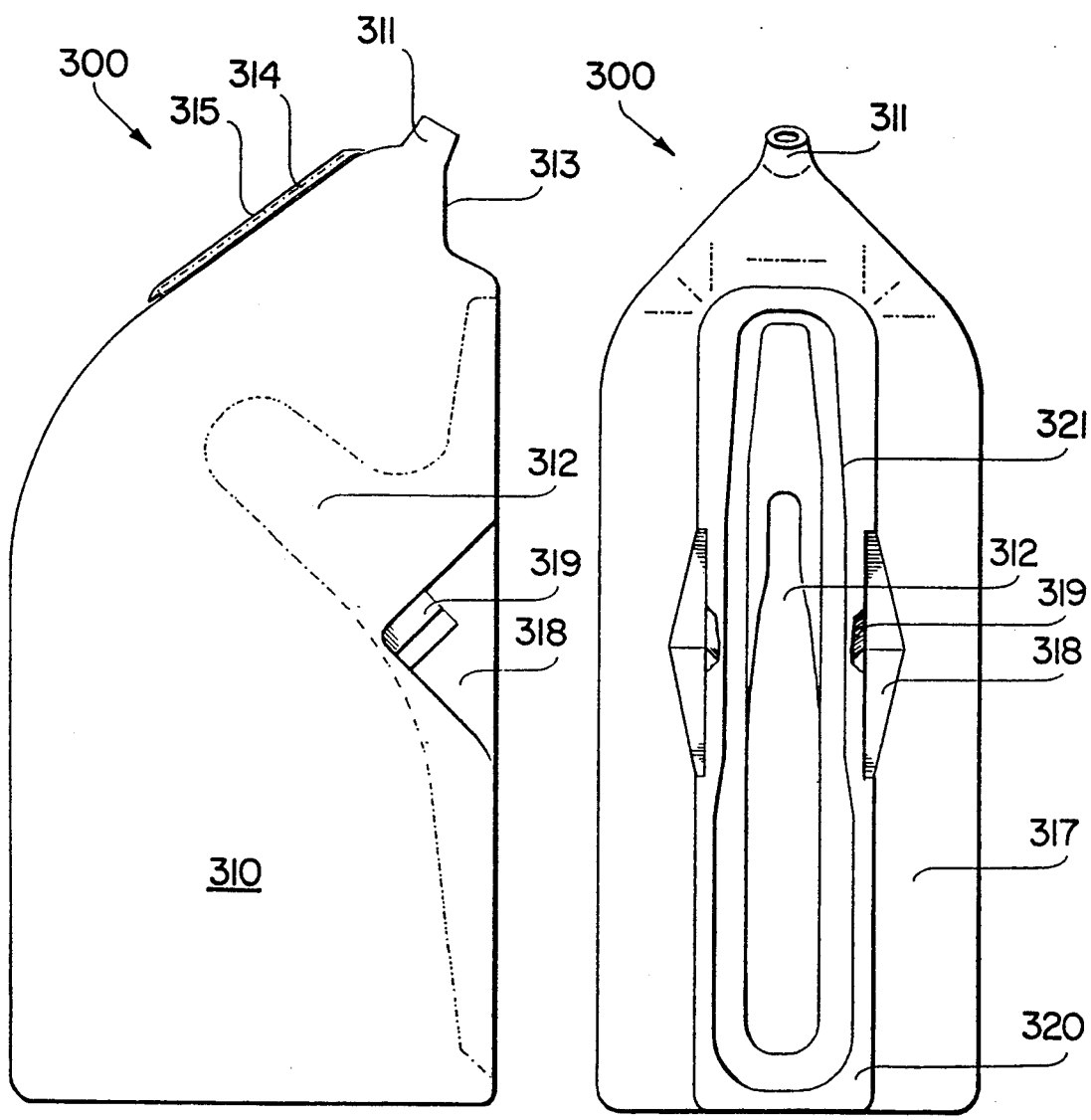

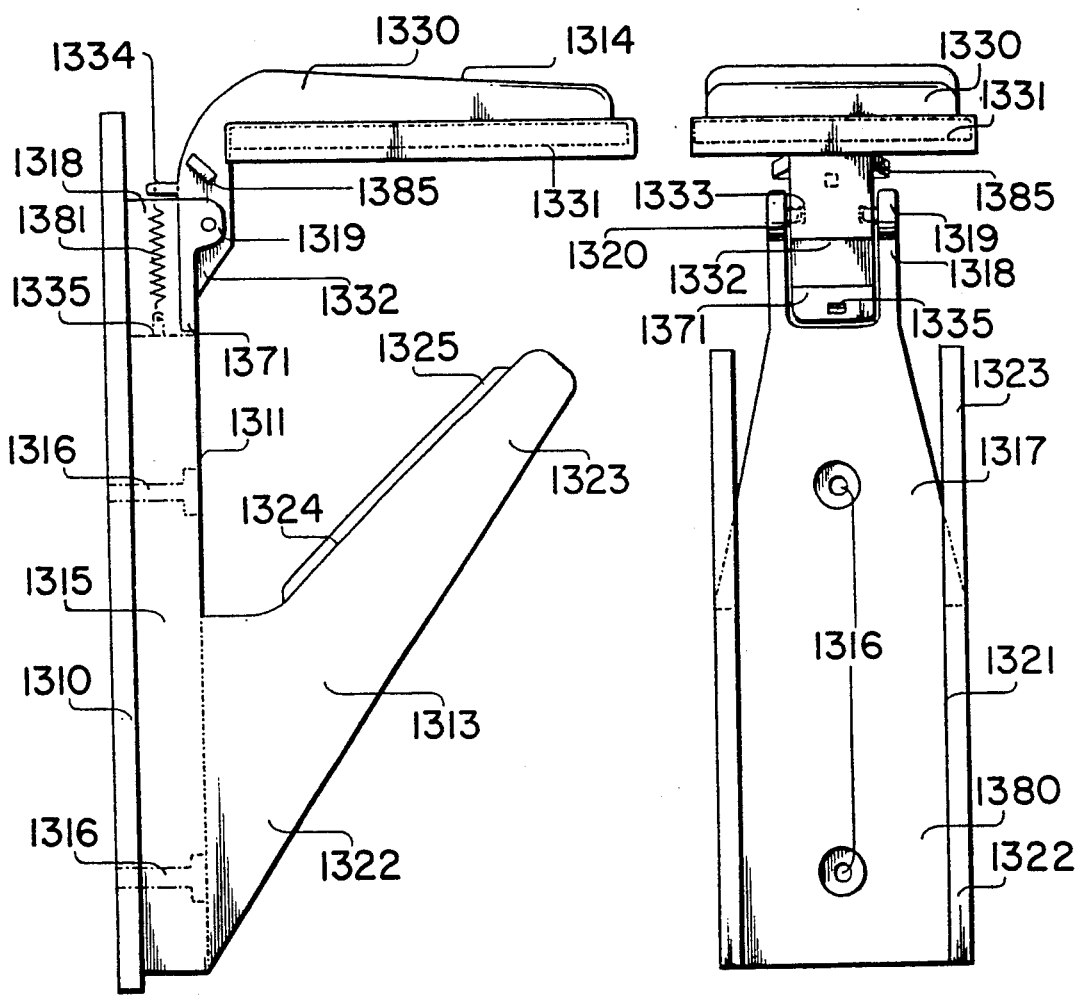

RECEPTACLE AND CO-OPERATIVE CARRIER THEREFOR

BACKGROUND OF THE INVENTION (i) Field of the Invention

This invention relates to a receptacle, e.g. a bottle and a co-operative carrier therefor, whereby the receptacle and the carrier are a unit. In one embodiment, it relates to a bottle and co-operative bottle carrier and mount for bicycles.

(ii) Description of the Prior Art

Bicycle riding has become very popular for transportation, recreation, and exercise. Like all vigorous physical activities, bicycle riding makes the participant thirsty, and he or she will often want to drink a refreshing beverage. Accordingly, many riders will take a beverage with them on the bicycle, especially if they are going on a long ride. Often, the rider will prefer not to stop to take a drink. In that case, it is desirable that the beverage bottle be readily accessible and convenient to open.

It is accordingly common for one involved in the sport of bicycling to carry a supply of liquid while riding. This supply of liquid is generally contained in a bottle which can be carried on the bicycle by means which is affixed to a portion of the bicycle frame and into which the rider inserts the bottle when not in use.

Bottles and bottle mounts made especially for bicycles are available commercially. There are severally shortcomings and inefficiencies associated with the most commonly used of these bottle and cage devices. One type, the cage mount, is usually a simple wire holder or basket which can be affixed to the bicycle and receive a beverage container. This receptacle cage thus may be a simple wire or plastic cage-like bottle holder which is affixed to the bicycle frame and into which the bottle must be inserted or out of which it must be removed while riding. In some cases, the container fits fairly loosely in the cage and presents a possibility that the container can fall out, especially when the bicycle is accidentally tipped over. The user may not observe that the container has fallen out, and it might be lost. In other cases, the bottle fits tightly within the cage, and although it is not as likely to fall out, it is fairly hard to remove.

Tension of the cage is present but does vary considerably with some cages being so loose as to permit the bottle to fall out as a result of vibration during riding, whereas other cages are so tight that the rider must exert considerable pressure to remove the bottle. Both situations distract the rider from devoting full attention to control of the bicycle and sometimes result in accidents causing serious injury.

The cage, having many contact points with the surface of the bottle, does considerable damage to the exterior finish of the bottle over time as a result of the insertion and removal process. This adds cost due to a higher than necessary bottle replacement frequency. Furthermore, the cage protrudes from each side of the bicycle frame and is often damaged when a bicycle falls over.

Another type of commercially available bottle mount comprises a bracket having a tapered dovetail slot and a bottle having a complementary dovetail rib. This type of holder is even more difficult to use than the cage type, inasmuch as the bottle must be turned about its axis and positioned with the dovetails aligned before it can be slided lengthwise into position. The difficulty of repositioning the bottle after it is used is a serious disadvantage and constitutes somewhat of a hazard to the bicyclist. The dovetail mount does, however, have the advantage of being a relatively small and lightweight form of connection between the bottle and the bicycle, as compared to the somewhat larger, heavier cages.

Another problem area is the actual bottle used within the bottle mount. The bottle is generally a cylindrical container having a wide closure at the top for filling purposes and a smaller closure at the top of this wide closure which is used for drinking from. This smaller closure generally has a seal which is activated by pushing downwards and released by pulling upwards.

The top of the bottle is normally unprotected from the elements and accumulates an amount of dirt, mud, road grease, and other substances which are thrown up by the wheels during riding. These substances enter the body via the mouth when drinking causing an element of risk to rider health.

The seal of the bottle must be opened in order to drink and this is generally accomplished by gripping the seal with the teeth as the rider pulls forward on the bottle. This, in addition to distracting the rider again causes dirt to enter the mouth. The forces exerted on the top during opening and closing of the seal often cause tears in the top of the closure after a period of time.

Capacity of the bottle is generally restricted to two sizes which can be accommodated by the standard cage, these are approximately 600 ml and 800 ml. Riders often carry 2 bottles and sometimes three or four in order to have sufficient fluids to meet their needs. The result of carrying these extra bottles is added weight as well as extremely awkward and sometimes dangerous mounting locations for the second and subsequent bottles.

Location and angle of the drinking spout causes the rider to generally hold the bottle directly in front of the face and angled upwards while drinking. This obstructs the rider's forward view and sometimes results in accidents causing injury.

Insulation added will decrease the bottle's capacity to hold fluids. Insulation added to the outside surface of the bottle is generally of a rubbery compound which causes the bottle to be very difficult to release from and insert into the cage. Because of these problems most riders use the uninsulated bottle and are subjected to warm and unpalatable fluids.

Aerodynamics of the bottle are poor since the bottle is cylindrical having a diameter much larger than the frame tube it is attached to. The cage adds to this aerodynamic disadvantage since it extends outward beyond the bottle. These poor aerodynamics have the effect of adding time to a riders race or trip as well as adding to rider fatigue.

More particularly, in the prior art, a fixture for mounting a water-bottle on a bicycle frame, generally included a fixing member having a fixing means, the fixing member being fixed to the frame and carrying a support member made mainly from metallic wires. The fixing member was fixed to the frame through the fixing means and the water-bottle detachably engages with the support member, thereby being mounted on the frame. The water-bottle was mainly cylindrical and had at the head a faucet covered by a cap, at its head. The bottle was mounted on the cylindrical frame through the fixture in such a way that an increased air resistance was created against the bicycle's running.

During the running of the bicycle, air flows from the front of the frame rearwardly along both sides thereof and then enters into the gaps to cause eddy air currents, the eddy air currents increasing the air resistance as a whole against the bicycle's running. The air resistance will increase in proportion to the running speed of the bicycle to thereby hinder its running at high speed and inducing increased fatigue in a rider.

U.S. Pat. No. 4,386,721 patented Jun. 7, 1983 by Keizo Shimano provided a water-bottle and a fixture for mounting the water-bottle, in which the fixing member, which had a support member for detachably supporting the water-bottle, was provided with a pair of skirts in contact with both sides of the water-bottle supported to the support member and with both sides of the bicycle frame carrying the water-bottle, thereby covering recessed gaps produced between the water-bottle and the frame. The skirts closing the recessed gaps formed the external surfaces including both sides of the frame and water-bottle. Hence, a smooth air flow rearward of the bicycle during its running was said to be obtained which was free from the eddy air currents generated by the conventional bicycle water-bottle.

U.S. Pat. No. 4,437,596 patented Mar. 20, 1989 by W. B. Shook provided a wire bottle cage, which had an open end and a closed or stop end with a back formed of laterally-spaced longitudinally-extending wires with a bumper and guide at the front and a catch and guide at the back. This served to cause the corner, at the bottom of the bottle, to slide along the back wires as it was inserted into or removed from the cage. The patented device also included special mounting means to attach the cage to a cycle bar in such a manner as not to interfere with the sliding action of the bottle on the back wires, and positively to lock the cage in place on the bar.

U.S. Pat. No. 4,441,638 patented Apr. 10, 1984 by K. Shimano provided a water-bottle for a bicycle which included a pair of side walls extending longitudinally and vertically from the bicycle. A connecting wall was a continuation of the side walls. The connecting wall included a front surface portion along the bicycle frame having the surface of a circular arc and a rear surface portion facing rearwardly of the bicycle. The body had a thin block-shape. An interval between the outer surfaces of both the side walls became gradually smaller from the front toward the rear and the rear surface portion of the connecting wall was curved in a circular arc with a curvature smaller than that of the bicycle frame. This made the body together with the frame carrying it streamlined. The water-bottle had the body constructed so as to be streamlined together with the frame. The body of a thin blocklike shape enabled the cyclist to drink water from the water-bottle with ease by holding it between his fingers. The water-bottle was detachably mounted on the bicycle frame by use of the above-described fixture.

U.S. Pat. No. 4,544,077 patented Oct. 1, 1985 by H. Rucher provided a liquid container having a container body provided with an open top. A slot extended through the side wall of the container body, and a liner of liquid absorbing material surrounded the outer surface of the container body and covers the slot. A top cover was removably mounted on the container body in covering relationship to the open top thereof, the top cover having a liquid outlet which the liquid in the container can be removed therefrom. The top cover had a leg depending therefrom which was movable into and out of closing relationship to the slot so that liquid from the container body can be adjustably allowed to pass through the slot from the container body and into contact with the inner surface of the liner. When the ambient air and the container move relative to each other, evaporative cooling occurred which caused the liquid in the container body to be cooled.

U.S. Pat. No. 4,883,205 patented Nov. 28, 1989 by W. P. Saeleno et al provided an insulated bottle rack apparatus for bicycles having a rack or cage with a bottle receiving area. It included a first side and a second side opposite to the first side, so that the first and second sides tightly held against a bottle disposed therein. A foam rubber sleeve extended around the exterior of the rack for insulating a bottle being held by the rack.

U.S. Pat. No. 4,830,239 patented May 16, 1989 by G. J. Tackles et al provided a water-bottle cage comprising two mating sections formed of injection molded plastic. The two sectrons defined a bayonet snap assembly which maintained alignment of the two sections, permitted easy pivotal joining and release of the two sections, and locked the two sections upon insertion of a water-bottle.

U.S. Pat. No. 4,957,227 patented Sep. 18, 1990 by J. Trimble provided a carrier for one or more water-bottles attached to the support rails of a bicycle saddle. A bracket included clamping structure at one end to attach to ends of the support rails. At the other ends the clamping structure had the structure to support one or more water-bottles. The carrier positioned the one or more water-bottles rearwardly of the rider's buttocks and thighs so as to reduce aerodynamic drag while riding.

The art was also faced with the problem of providing means for automatically sealing the container upon placing the bottle in the holder. Automatic such closure devices are also known.

U.S. Pat. No. 1,115,656 patented Nov. 3, 1914 by W. D. Fritschle provided a combined bottle closure and retaining device which included an upright flexible shank and a flexible looped end to which a stopper or cap was secured. The device was mounted on a shelf. When it was desired to place a bottle on the shelf and simultaneously to seal the bottle, it was necessary only to engage the open end of the bottle against the stopper so that the stopper just rose and then returned to a position closing the bottle.

U.S. Pat. No. 1,292,480 patented Jan. 28, 1919 by F. Kessel provided a support for table articles including a condiment holder support comprising a dish-shaped base attached to a resilient bracket carrying a cover. The condiment holders were inserted in the support by depressing the base with the base of the condiment holder, and placing the tip of the condiment holder under the cap.

U.S. Pat. No. 1,436,515 patented Nov. 21, 1922 by R. B. Mitchell provided a bottle holder which included an upper plate which could be sprung upwardly. A lower plate supported the neck of a bottle. The bottle could not be inserted or removed without upward springing of the upper plate.

U.S. Pat. No. 2,441,417 patented May 11, 1948 by T. J. Hopkins provided a rack for empty milk bottles in which the milk bottles were supported by means of a series of bottle-holding pins pivotally mounted thereon. The pins extended to an operative position and retracted to an out of the way position when not in use. The support was attachable to a wall at any desired height from the floor.

U.S. Pat. No. 2,710,694 patented Jun. 14, 1955 by R. R. Carr provided a condiment holder and closure for containers which included a shelf member having a rigid core. A foam or sponge rubber strip was secured to the core and was covered by a plastic sheet that would effectively seal and close the open end of a container. That operation retained the container in a sanitary condition.

U.S. Pat. No. 4,050,584 patented Sep. 27, 1972 by J. L. Lino provided a holder for open containers. The holder included a pair of confronting parallel surfaces, one of which supported a resilient material which was adapted to exert pressure against the open mouth of the container, thereby to seal and hold the container in place.

The art was also faced with the problem of providing a suitable bottle mount. Among the desirable features of such a carrier for a bottle are that it should: hold the bottle more securely; permit fluid consumption with less rider effort; keep the top clean of contaminants; open the drink spout automatically for the rider; re-seal the drink spout automatically for the rider; reduce instances of support fixture damage; eliminate bottle surface damage by the fixture; improve aerodynamics; permit more effective insulation properties; and permit a greater variety of bottle capacity options.

Some patents provided bottle mounts and/or bottles which purported to provide some of such desired characteristics.

U.S. Pat. No. 2,926,828 patented Mar. 1, 1960 by R. Kuddie provided a vacuum bottle holder and rack including a cage having an apertured upper plate brackets for securement beneath the dashboard of an automobile. It also included side webs and lower resilient cushion pads to support the vacuum bottle.

U.S. Pat. No. 4,009,810 patented Mar. 1, 1977 by W. B. Shooh provided a cage for receiving and holding a water bottle which can be readily attached to a bicycle frame or the like. It consisted of a single piece of resilient wire bent to form the cage with a solderless, weld-free connection for the joint at the adjacent ends of the wire. This connection, along with a special mounting means, was also to provide a less abrasive protective surface in the form of bumper tubes for frictionally engaging and gripping the bottle.

U.S. Pat. No. 4,088,250 patented May 9, 1978 by D. J. Shaefer Provided an insulating carrier for containers, including a receptacle adapted to receive and enclose a container holding hot or cold contents to be kept at substantially a desired temperature for an extended length of time. The receptacle included a generally cup-shaped open-topped body formed from insulating foam plastic material and providing an upwardly opening container-receiving chamber. An external, generally-radially-extending and axially-elongated lug handle on the receptacle body was adapted for assembly of an adaptor for mounting the carrier on a support. The adaptor included a body portion for engaging the lug handle of the receptacle, and had means for securing the adaptor to the receptacle body and means for attaching the adaptor to a support on which the carrier is to be mounted. A neck on the upper end of the receptacle body projected upwardly above the upper end of the lug handle. An insulating cover for closing the open top of the body had a skirt flange for retaining engagement with the neck. When removed from the top of the receptacle body, the cap was adapted to be engaged for safekeeping or as a coaster with the bottom of the receptacle body.

U.S. Pat. No. 4,193,525 patented Mar. 18, 1980 by G. L. Sommers provided a small personal size carrier for containing and insulating elongated beverage containers against ambient heat transfer relative thereto. The carrier comprised loosely telescopingly related inner and outer cylindrical shells defining an annular space between the opposing outer and inner surfaces thereof and the shells have radially registered substantially rectangular openings formed through corresponding wall portions thereof intermediate the opposite ends of the shells and with the openings oriented longitudinally of the shells. One of the shells included generally radially projecting integral flanges extending about the corresponding opening and at least substantially bridging the radial spacing between the aforementioned wall portions. The inner and outer shells included spaced end and closure walls, respectively, closing the opposite ends thereof and foam insulation is disposed between the opposing outer and inner surfaces of the shells and end and closure walls. A heat insulative partial cylindrical door was hingedly supported from the carrier and was swingable between open and closed positions providing unobstructed access through and closing, respectively, the aforementioned openings.

A bottle and bottle mount was provided in U.S. Pat. No. 4,345,704 patented Aug. 24, 1982 by M. S. Boughton. This mount had a ring for connecting it to a frame tube or handlebars of the bicycle and a curved plate. One element of a hook and loop cloth fastener was affixed to the concave surface. The bottle included a receptacle having an outer surface that was complementary throughout its circumferential extent to the concave surface of a mount. The other element of the hook and loop cloth fastener was affixed to the complementary outer surface of the receptacle. The receptacle has an opening that receives a removable cap.

SUMMARY OF THE INVENTION

(i) Aims of the Invention

An object of this invention is to provide a receptacle and mount combination in which a dispensing aperture in the receptacle is automatically closed by fitting the receptacle in the mount.

Another object of this invention is to provide such receptacle and carrier combination in which the assembly and disassembly of such combination is easily and efficiently achieved by a smooth one-handed operation.

An object of this invention is to provide a bottle carrier and bottle combination for bicycles that combines the advantages of comparatively small size, light weight and reliability and ease of use by means of a one-handed operation with minimum or reduced likelihood of loosing control of a moving bicycle.

Another object of this invention is the provision of a bottle carrier and bottle combination in which there is greater security in the combination bottle/bottle carrier so that there is less risk of the bottle being accidentally dislodged from the carrier.

Another object of this invention is to provide a novel combination set of, e.g., salt and pepper shaker or cream and sugar receptacles in which the combination is assembled and disassembled in a smooth and easy manner while automatically closing the apertures in the salt and pepper shaker, and simultaneously sealing out moisture.

Yet another object of this invention is to provide a novel combination of a plurality of canisters in which each unit of the combination is assembled and disassembled in a smooth and easy manner while automatically closing the opening of the canister while the combination of canister and mount is being assembled.

(ii) Statement of Invention

A first embodiment provided by this invention comprises a receptacle, for use in combination with a mount, the receptacle provided with an internal, closed-ended pocket which is open at one face of the receptacle, the pocket being adapted to co-operate with, and to mate with, a support arm on the mount, a pair of laterally-spaced grippable depressions located in the exterior of the receptacle, the depressions being adapted to be gripped by laterally-spaced gripping members on the mount, and an opening located in the receptacle, the opening being adapted automatically to be sealed by means of a resiliently-biased closure on the mount.

A second embodiment provided by this invention comprises a receptacle and mount combination, the mount comprising: a base for securement to a selected surface, the base including an angular support arm projecting from the base, laterally-spaced gripping members co-operatively associated with the support arm and projecting from the base, and an upper, resiliently-biased closure; and the receptacle including an internal, closed-ended pocket which is open at one face of the receptacle, the pocket being adapted to co-operate with, and to mate with, the support arm, the receptacle also being provided with laterally-spaced grippable depressions, located in the exterior of the receptacle, and an opening located in the receptacle, the opening being adapted automatically to be sealed upon fitment of the receptacle with respect to the mount by means of the resiliently-biased closure means on the mount.

A third embodiment of this invention provides a bottle and carrier combination for use on a bicycle, the carrier comprising: a base for securement to a selected surface of a bicycle frame, the base including an angular support arm projecting from the base, laterally-spaced gripping members co-operatively associated with the support arm and projecting from the base, and an upper, pivotally-mounted, resiliently-biased hood; and the bottle comprising: an internal, closed-ended pocket which is open at one face of the bottle, the pocket being of the complementary shape, size and location as, and being adapted to mate with, the support arm, the bottle also including female grippable depressions located in the exterior of the receptacle, the depressions being of the complementary shape, size and location as, and adapted to mate with, the laterally-spaced gripping members, and an opening located in the bottle adapted to be sealed upon fitment of the bottle with respect to the carrier by pivoting of the resiliently-biased hood with respect to the carrier upon placement of the bottle on the carrier.

Another embodiment provided by this invention comprises a mount for use with a pair of receptacles, the mount comprising a central upright column provided with two oppositely-positioned, angularly-upwardly-projecting pairs of laterally-spaced-apart support arm means, a pair of upper, pivotally-mounted, resiliently-biased caps, and a platform supporting the central upright column.

Another embodiment provided by this invention comprises a pair of receptacles for use with a mount, each such receptacle being provided with laterally-spaced-apart, co-operative grippable means engageable with support arm means, and an upper opening adapted to be closed automatically by actuated pivoting of respective resiliently-biased cap.

Another embodiment provided by this invention includes a pair of receptacles and a mount combination, the mount comprising: a central upright column provided with two oppositely-positioned, angularly-upwardly-projecting pairs of laterally-spaced-apart support arm means, a pair of upper, pivotally-mounted, resiliently-biased caps, and a platform supporting the central upright column; each receptacle of the pair of receptacles (which may be either a salt and pepper set or a cream and sugar set) being provided with laterally-spaced-apart, co-operative grippable means engageable with the support arm means, and an upper opening adapted automatically to be closed by actuated pivoting of the resiliently-biased cap with respect to the central column.

Another embodiment provided by this invention includes a pair of receptacles and a mount combination, the mount comprising: a central upright column provided with two oppositely-positioned, angularly-upwardly-projecting pairs of laterally-spaced-apart support arm means, a pair of upper, pivotally-mounted, spring-biased caps, and a platform supporting the central upright column; each receptacle of the pair of receptacles (which may be either a salt and pepper set or a cream and sugar set) being provided with laterally-spaced-apart, co-operative grippable means engageable with the support arm means, and an upper opening adapted automatically to be closed by actuated pivoting of the cap with respect to the central column.

Another embodiment provided by this invention comprises a mount for use with a plurality of receptacles, the mount comprising a base, a plurality of lower pairs of laterally-spaced-apart angularly-upwardly-projecting support arm means projecting from the base, and plurality of upper pivotally-mounted, resiliently-biased outwardly-projecting lids.

Another embodiment provided by this invention comprises a plurality of receptacles for use with a mount, each receptacle comprising a rectangular parallelepiped, open-topped receptacle (e.g. canister) having two laterally-spaced-apart means which are adapted to mate with laterally-spaced-apart support arm means, the spacing of a transverse space between the two laterally-spaced-apart means in the receptacle (e.g. canister) being the same as a space between a pair of co-operative support arm means, the open top of the canister being adapted to be closed by means of actuated pivoting of a lid.

Another embodiment provided by this invention includes a plurality of receptacles and a mount combination, the mount comprising a base, a lower plurality of pairs of laterally-spaced-apart, angularly-upwardly-projecting support arm means projecting from the base, and a plurality of upper pivotally-mounted, resiliently-biased outwardly-projecting lids; the receptacles each comprising a rectangular parallelepiped, open-topped receptacle (e.g. canister) having two laterally-spaced-apart means which are adapted to mate with laterally-spaced-apart co-operative support arm means, the spacing of a transverse space between two laterally-spaced-apart means in the receptacle (e.g. canister) being the same as the space between a pair of co-operative support arm means, the open top of the receptacle (e.g. canister) being adapted to be closed by means of actuated pivoting of the lid with respect to the base.

Another embodiment provided by this invention includes a plurality of receptacles and a mount combination, the mount comprises a base, a plurality of lower pairs of laterally-spaced-apart, angularly-upwardly-projecting support arm means projecting from the base, and a plurality of an upper pivotally-mounted, spring-biased outwardly-projecting lids; the receptacles each comprising a rectangular parallelepiped, open-topped receptacle (e.g. canister) having two laterally-spaced-apart slots therein of the same complementary shape and size and location as, and adapted to mate with, co-operative support arm means, the spacing of a transverse space between the two laterally-spaced-apart slots in the receptacle (e.g. canister) being the same as the space between a pair of co-operative support arms means, the open top of each canister being adapted to be closed by a respective lid by means of actuated pivoting of the respective lid with respect to the base.

Other Features of the Invention

In the first embodiment of this invention, the receptacle is provided with a centrally-positioned, internal, closed-ended pocket which is open at one face thereof, the pocket being adapted to co-operate with, and to mate with, a centrally-positioned support arm, the receptacle including a pair of laterally-spaced grippable depressions located in the exterior thereof, the grippable depressions being adapted to be gripped by laterally-spaced gripping members on the mount, and an opening located in the receptacle, the opening being adapted automatically to be sealed by actuating pivoting of a resiliently-biased closure on the mount.

The second embodiment of the invention includes a mount having a base for securement to a selected surface and a receptacle. The mount includes a base, and the base includes an angular, central support arm projecting from the base, laterally-spaced gripping members co-operatively associated with the central support arm and projecting from the base, and an upper, pivotally-mounted, resiliently-biased closure. The receptacle includes: a central, internal, closed-ended pocket which is open at one face thereof, the pocket being adapted to co-operate with, and to mate with, the central support arm, the receptacle including laterally-spaced grippable depressions, and an opening located in the receptacle, the opening being adapted automatically to be sealed upon fitment of the receptacle with respect to the mount by pivoting of the resiliently-biased closure means with respect to the mount.

The third embodiment of the invention includes a carrier having a base for securement to a selected surface of a bicycle frame and a bottle. The carrier has a base, and the base includes: a central, angular-support arm projecting from the base, laterally-spaced gripping members co-operatively associated with the central support arm and projecting from the base, and an upper, pivotally-mounted, resiliently-biased hood. The bottle includes: a central, internal, closed-ended pocket which is open at one face thereof, the pocket being of the complementary shape, size and location as, and being adapted to mate with, the central support arm, the bottle also including laterally-spaced female grippable depressions located in the exterior thereof, the depressions being of the complementary shape, size and location as, and adapted to mate with, the gripping members, and an opening located in the bottle, the opening being adapted to be sealed upon fitment of the bottle with respect to the carrier by pivoting of the resiliently-biased hood with respect to the carrier upon placement of the bottle on the carrier.

The support arm located on the exterior of the mount is of generally oval cross-section, and such support arm preferably includes a wide lower body portion converging to a narrower free end portion. The gripping members preferably comprise a pair of longitudinally-spaced-apart, upstanding lateral walls, each wall being spaced from the support arm means. Such upstanding lateral walls preferably have a generally rectangular cross-section, and have a generally triangular side elevational appearance. It preferably is provided with gripping means in the form of rhomboidally-shaped, inwardly-facing projections.

The pivotally-mounted, resiliently-biased, or spring-biased hood is preferably spring-biased by means of co-operation with a spring tension member. Such spring tension member may either be formed with, or be mounted to, the base of the carrier. Such hood is preferably pivotally mounted between a pair of support risers projecting from the base of the mount, e.g. by spaced-apart stubs on the hood fitting into pivot wells in the support risers, or by a pin passing through aligned apertures through the hood and through the support risers.

The actuated pivoting is preferably achieved by means of a hood-closing member on the hood, the hood-closing member cooperating with, and contacting, a manually-moved closing surface on the bottle.

Rather than the pivotably-mounted hood, an angularly-upwardly-projecting closure ramp may be provided, the ramp surface being provided with resilient means for sealing the bottle.

The lower face of the base of the mount is preferably provided with a pair of lateral, depending, inwardly directed, bicycle-frame-contacting flanges The bottle preferably is an aerodynamically-shaped bottle. In such bottle, the internal pocket of the bottle includes a wide inlet portion converging to a narrower closed end portion. The depth of the internal pocket is about the same as the length of the support arm.

The co-operative female grippable means preferably comprises a pair of longitudinally-spaced-apart shallow lateral pockets, each lateral pocket being spaced laterally from the internal pocket channel or well. The shallow lateral pockets are preferably also provided with rhomboidally-shaped internal depressions extending internally from the base of the shallow pocket.

The bottle preferably is of an aerodynamical-shape. The internal pocket of the bottle includes a wide inlet portion converging to a narrower, closed-end, portion. The bottle preferably includes a manually-openable filling aperture as well as the above-described automatically openable and closeable outlet aperture.

In the eleventh to fourteenth embodiments of the invention, the platform preferably is provided with lower, gripping suction pads. In these embodiments, the support arm means are preferably of generally rectangular cross-section. In plan view, they include a wide lower body portion converging to a narrower free end portion. The length of the support arm means generally is about the same as the depth of the internal pocket of the receptacle which is adapted to be impaled thereon. The co-operative grippable means preferably comprises inwardly directed edges or ends on the support arm means.

Each receptacle includes a pair of lateral slots in the side walls, of the same shape, size and location as, and are adapted to mate with, the support arms means. In addition each of these slots is provided with a pentagonally-shaped depression of the same shape, size and location as, and is adapted to mate with, the co-operative securement support means.

The pivotally-mounted, resiliently-biased, or spring-biased hoods are preferably spring-biased by means of co-operation with spring tension tabs. These spring tension tabs are either formed with, or are fitted on, the upright column of the mount.

In each combination of these embodiments of this invention, each such cap may be pivotally mounted between a pair of support arms extending laterally from the top of the central upright column. Such pivotal mounting may be achieved by spaced-apart stubs on the support arms of the carrier fitting into pivot wells in the lid.

Since the receptacles are each provided with dispensing openings, the actuated pivoting of the caps to seal the respective opening in the receptacles may be achieved by means of a cap-closing contact protrusion on the receptacle which co-operates with a protruding arm on the cap.

In the fifteenth to eighteenth embodiments of the invention, each of such support arm means is preferably, of generally rectangular cross-section. Such support arm means, in plan view, includes a wide lower body portion converging to a narrower free end portion. The length of each such support arm means is the same as the length of the slot in the canister within which it is adapted to fit.

The pivotally-mounted spring-biased lid is spring-biased by means of co-operation with a fitted spring.

The lids may be mounted between a pair of support risers projecting from the base of the mount. The pivotal mounting may be achieved by spaced-apart stubs on the support risers fitting into pivot wells in the lids, or it may be achieved by a pin passing through aligned apertures in the lid and the support risers.

The actuated pivoting of the lid to seal the canister is preferably achieved by means of a depending arm on the lid cooperating with an actuating face on the upper portion of the canister.

BRIEF DESCRIPTION OF THE DRAWINGS

In the accompanying drawings,

FIG. 1 is a side elevational view of the carrier forming part of the present invention;

FIG. 1A is a side elevational view of an upper portion of the carrier forming part of the present invention;

FIG. 2 is a plan view of the carrier forming part of the present invention;

FIG. 2A is a plan view of an upper portion of a carrier forming part of the present invention;

FIG. 4 is a side elevational view of the bottle forming part of the present invention;

FIG. 5 is a back or rear elevational view, i.e. the carrier contact surface side, of the bottle of FIG. 4;

FIGS. 11-16 are views of a second embodiment of this invention in which

FIG. 11 is a side elevational view of the carrier forming art of that embodiment;

FIG. 12 is a top plan view of the carrier of FIG. 11;

FIG. 13 is a side elevational view of the container used with the carrier of FIG. 11 to provide the second embodiment of this invention;

FIG. 14 is a rear or back elevational view of the container of FIG. 13;

FIG. 15 is a top plan view of the containers of FIG. 13;

FIG. 16 is a side elevational view of the container/carrier of this embodiment of this invention in the form of a salt and pepper set;

FIGS. 17-24C are views of a third embodiment of this invention, in which

FIG. 17 is a front elevational view of the base board forming part of this embodiment of the invention;

FIG. 18 is a side elevational view of the base board and carrier forming part of this embodiment of the invention;

FIG. 19 is a front elevational view of the carrier of FIG. 18;

FIGS. 20 is a side elevational view of the canister forming part of this embodiment of the invention;

FIG. 21 is a front elevational view of the canister of FIG. 20;

FIG. 22 is a top plan view of the canister of FIG. 20;

FIG. 23 is a side elevational view of the canister/carrier combination providing the third embodiment of this invention; and FIGS. 24A-24C are sequential side elevational views of the canister/carrier combination of FIG. 24 showing the removal of the canister from the carrier.

Figure 3:
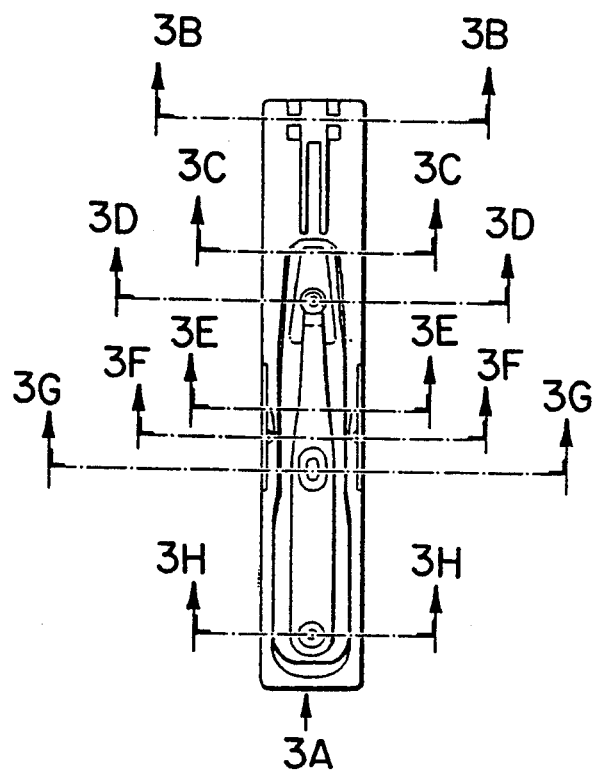
FIG. 3 is a plan view of a carrier showing the location of the sections 3A-3H.
Figure 3A:
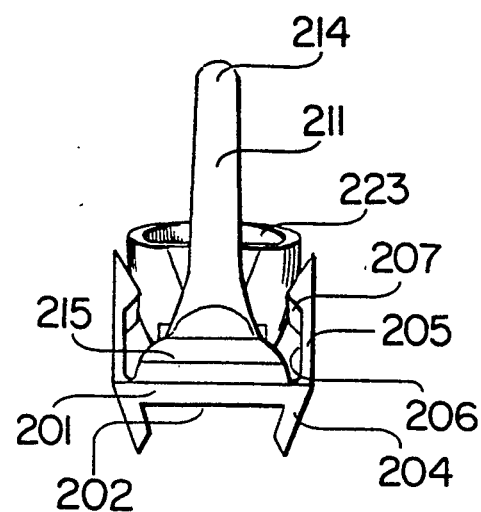
FIGS. 3A-3H are front elevational views of the carrier as viewed from arrows 3A-3H respectively of FIG. 1.
Figure 3B:
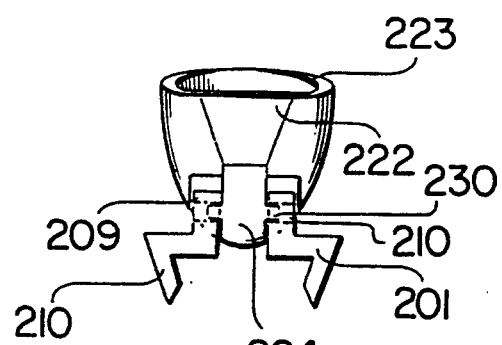
Figure 3C:
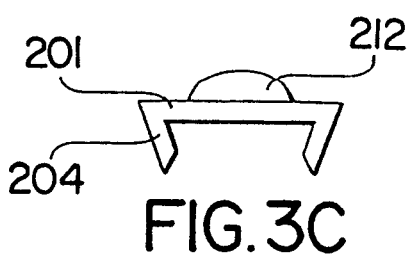
Figure 3D:
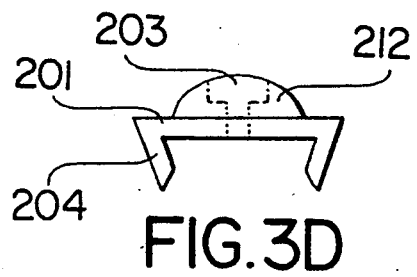
Figure 3E:
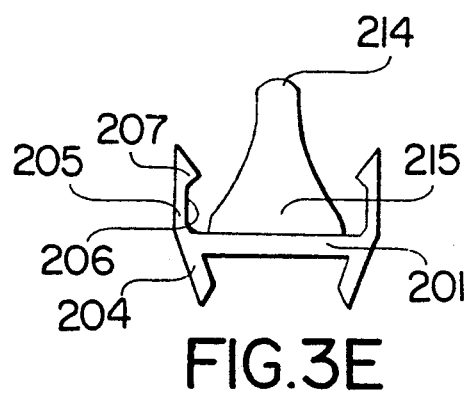
Figure 3F:
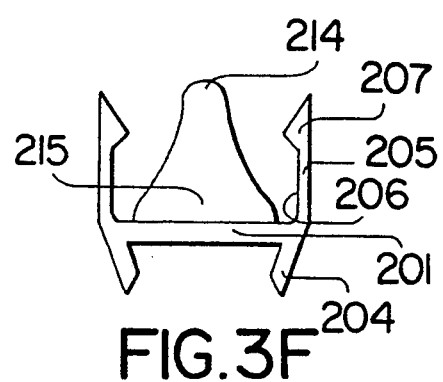
Figure 3G:
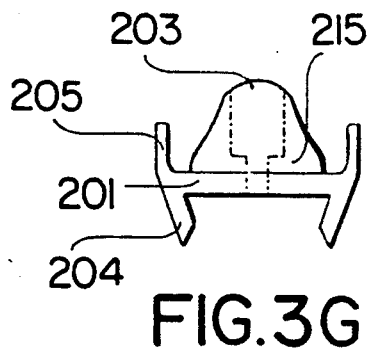
Figure 3H:
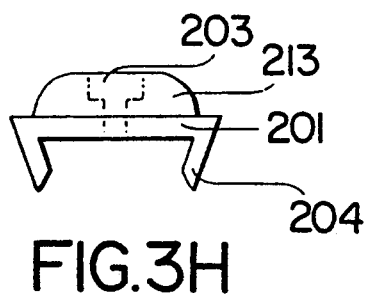

DESCRIPTION OF PREFERRED EMBODIMENTS (i) Description of First Through Tenth Embodiments of FIGS. 1-9

As seen in FIGS. 1-3H inclusive, the carrier 200 includes a rectangular plate 201 which has a flat bottom face 202 through which three spaced-apart holes 203 are drilled and which is also provided with converging support flanges 204. The plate 201 is provided with a pair of laterally-spaced-apart gripping or locking tab support members 205, which are either formed integral with, or are welded to, the plate 201 parallel to its central longitudinal axis and at the marginal edges thereof. Each member 205 is substantially triangular in side elevation. Projecting from each inner face 206 of member 205 is a rhomboidally-shaped gripping projection or tab 207.

The upper end 208 of the plate 201 is provided with a pair of lateral ears 209, each being provided with a bore 210 therethrough whose purpose will be described hereinafter.

Disposed along the central longitudinal axis of the carrier plate 201 is an alignment and support arm 211. The alignment and support arm 211, in side elevational view includes shallow upper and lower reaches 212, 213, and a central area from which extends an outwardly projecting finger 214.

As seen in FIGS. 3A-3H, the support arm 211 includes a broad base 215 which merges to narrow finger 214. The views in FIGS. 3A-3H show the variations in appearance of the plate 201 and the alignment and support arm 211 at selected points in the length of 204.

The lateral ears 209 are each provided with a bore 210 through which pivot pin 230 is mounted. The hood 220 cooperates with spring means 221 which is provided on carrier 200, so that it is sprung upwardly to the position shown in FIGS. 1 and 2.

As seen in FIGS. 1 and 2, the pivotally-mounted hood 220, is mounted within a bracket defined by the two laterally-spaced-apart ears 209.

The front view of the hood 220 shows that the hood 220 includes an inner well 223, which may be lined with a resilient sealing element 231. The side view shows a lower protruding chin 222. The lower face 224 of the hood 220 acts as a reaction surface against the spring 221 to provide the hood 220 in a spring orientation.

An alternative structure of co-operative bottle sealing means is shown in FIGS. 1A and 2A. As seen in FIGS. 1A and 2A, the upper end 208 of plate 201 supports an angularly-upwardly-projecting channel defined by side walls 402 and a closure surface 401 which is fitted with a sealing resilient block 403.

FIGS. 4-7 show one embodiment of the bottle 300. The bottle 300 includes a main chamber 310, provided with a dispensing spout 311. A deep well 312 formed within the interior chamber 310 of the bottle 300, well 312 being complementary in shape and size to that of the support arms 211. The bottle is also provided with a hood-closing reaction surface 313 adjacent the dispensing spout 311. In addition, the bottle 300 includes a refilling aperture 314, fitted with a sealing lid 315.

Figures 7, 9:
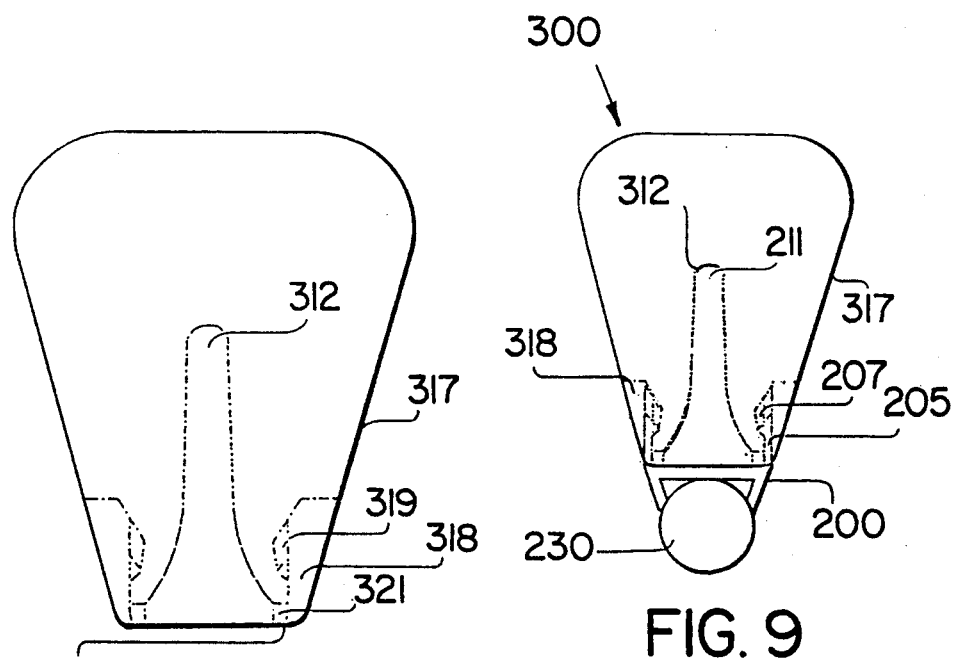
FIG. 7 is a bottom plan view of the bottle of FIG. 4.
FIG. 9 is a bottom plan view of the bottle/carrier combination of FIG. 8, including a bicycle frame member mounting surface.

As seen more clearly in FIGS. 4, 5 and 7, the side walls 317 of the bottle are each provided with a well 318 of the same complementary shape and size as the lock tab support walls 205 including a further depression 319, of the same complementary size and shape as the rhomboidally-shaped gripping projections 207. The rear face 320 of the bottle 300 is provided with a guiding peripheral internal ledge 321 which is complementary to the base of the support arm 211 adjacent to surfaces 212 and 213.

(ii) Description of the Eleventh Through Fourteenth Embodiments of FIGS. 11-16

FIGS. 11-16 show a second embodiment of the present invention in the form of a salt and pepper set 1200.

Figure 12:
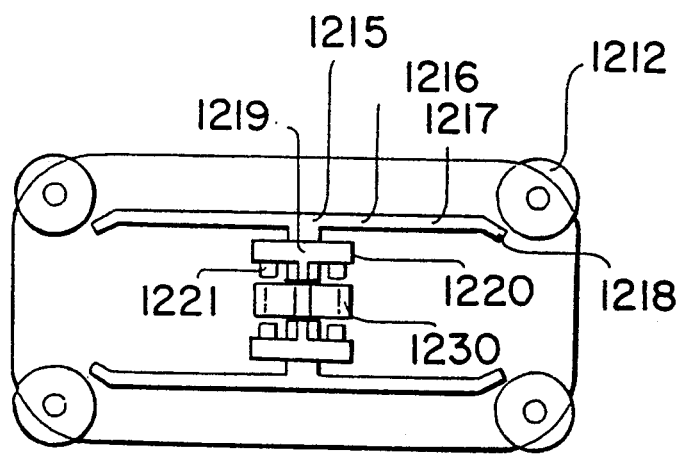

The carrier 1210 of the set 1200 includes a flat base 1211 from which a plurality, e.g. four suction cups 1212 project to secure the carrier 1200 to a flat surface (not shown). The upper face 1213 of the base 1211 is provided with an upright central post 1214, from which a laterally-spaced-apart pair of double support arms 1215 project. Each of the pairs of double support arms 1215 includes, in side elevation, a generally rectangular base 1216, and, projecting upwardly and longitudinally outwardly, a support finger 1217. As seen in FIG. 12, the cross-sectional shape of the arms 1215 is generally rectangular, and the tips of the fingers 1217 are inwardly bent at 1218.

The central post 1214 also supports a pair of laterally-spaced-apart cap supporting arms 1219. Each of the cap supporting arms 1219 includes a pair of longitudinally-directed ears 1220 each provided with an inwardly directed stub shaft 1221.

The upper end 1222 of the central post 1214 is provided with a pair of hingedly mounted caps 1223 mounted to the cap supporting arms 1219. Each cap 1223 includes a main cap portion 1227 and an inner sealing portion 1224, as well as a depending arm 1225. The cap supporting arms 1219 includes the transverse ears 1220 provided with a pair of stub shafts 1221 near the end thereof. The cap 1223 includes an aperture 1228 within which the stub shaft 1221 projects to secure the respective cap 1223 to the central post 1214. The central post 1214 is provided with a pair of outwardly projecting springs 1230 to cooperate with depending arm 1225 to control the opening and closing of the cap 1223.

Figure 13:
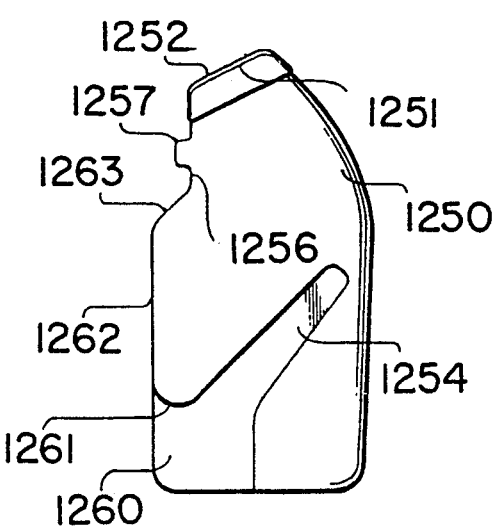
Figure 14:
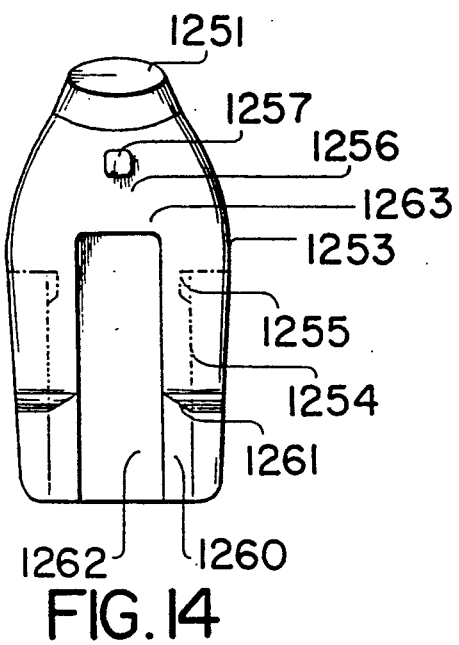
Figure 15:
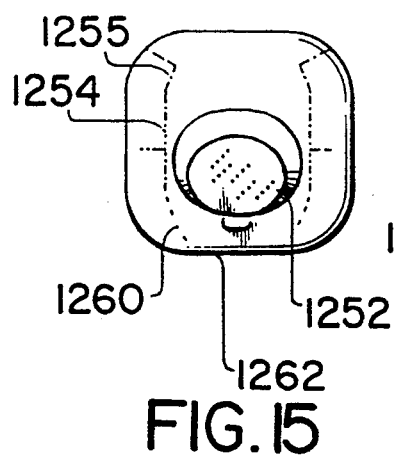

FIGS. 13-15 show various views of a container for use with the carrier 1210, i.e. a salt or pepper shaker 1250. Shaker 1250 includes an upper filling opening 1251 covered with a perforated cap 1252. The side walls 1253 are each provided with a depressed face 1254 of the same complementary size and shape and location as support arm 1215. Such depressed face 1254 is also provided with a shallow well 1255 of the same complementary size and shape and location as gripping projections 1218. The upper rear face 1256 of the shaker 1250 is provided with a cap-operating protrusion 257. For ease of alignment the channel 1260 tapers from depressed face 1254 to the rear face 1262. The rear face 1262 is provided with an angled portion 1263 to provide the operative face. The channel 1260 is provided with an upper edge 1261.

(iii) Description of Fifteenth Through Eighteenth Embodiments of FIGS. 18-25C

Figure 17:
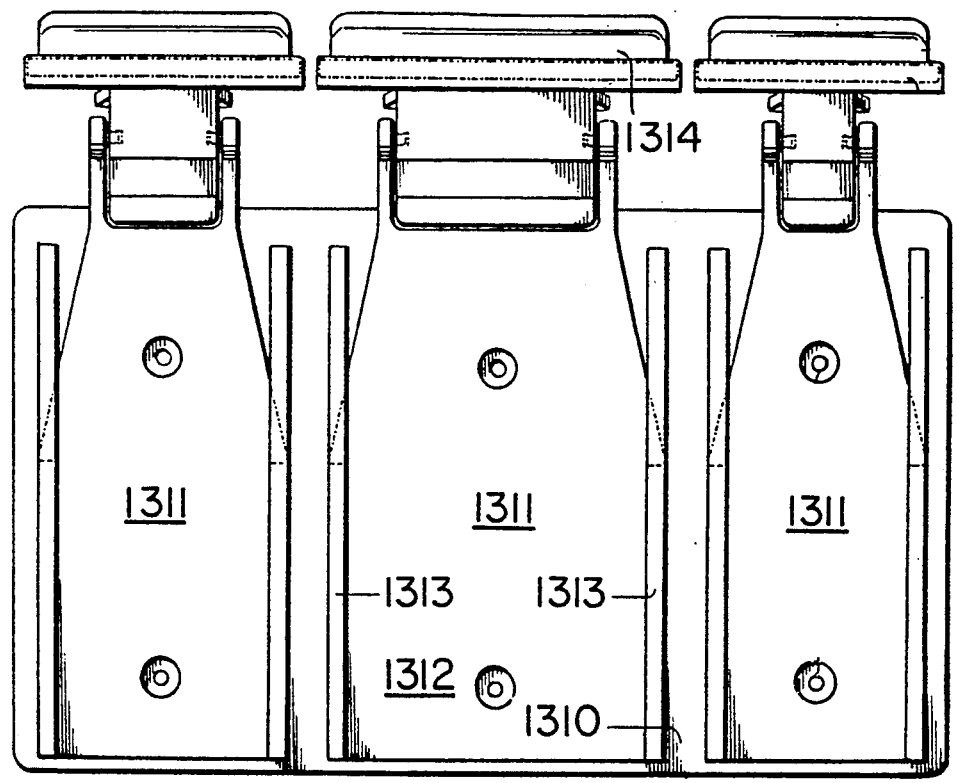

FIGS. 17-23 show a third embodiment of a carrier/container of this invention in the form of a canister set 1300. FIGS. 17-19 show one suitable configuration of carrier 1131.

As seen in FIG. 17, this embodiment of the invention includes a base board 1310 on which is mounted the carrier 1311 of this embodiment. It is observed that the base board may be omitted, and the carrier 1311 may be mounted directly on any suitable wall surface, if it is desired to have only one canister/carrier, or if the spacing of a plurality of canister/carrier sets is to be selected at will. The carrier 1311 includes a base plate 1312, a pair of spaced-apart, upwardly Projecting support arms 1313 and a spring, hingedly mounted lid 1314. A detailed view of the carrier 1311 is shown in FIGS. 18 and 19.

The carrier 1311 includes a base 1315 provided with a pair of holes 1316 therethrough by means of which the base 1315 may be secured to the wall surface (not shown) or to a base board 1310 (as shown in FIG. 17). In plan view, the base 1315 includes a lower rectangular section 1380, and a mid converging section 1317, which is capped by a pair of spaced-apart arms 1318. Each arm 1318 is provided with a projecting ear 1319 which includes an inwardly directed stub shaft 1320. The lateral edges 1321 of base 1315 are each provided with a support arm 1313 in the form of a wide base portion 1322 and a projecting upper finger portion 1323. The inner upper edge 1324 of the finger portion 1323 is provided with a guiding edge 1325.

The upper portion 1318 of the base 1311 is fitted with a lid 314. Lid 1314 includes a head 1330 including a lower sealing face 331 and a central depending tongue 1332. Tongue 1332 includes a Pair of lateral wells 1333 within which the stub shafts 1320 are fitted in order to provide the hinged connection of the lid 1314 to the carrier 1311. Tongue 1332 is provided with raised portions 385 to affect a mechanical stop for the maximum open position of the lid 1314 by resting against the top of portion 1318. A projection 1334 on the tongue 1332 cooperates with member 1335 on carrier 1311 to support a spring securement 1381 of the lid 1314 to the carrier 1311.

Figures 20, 21:
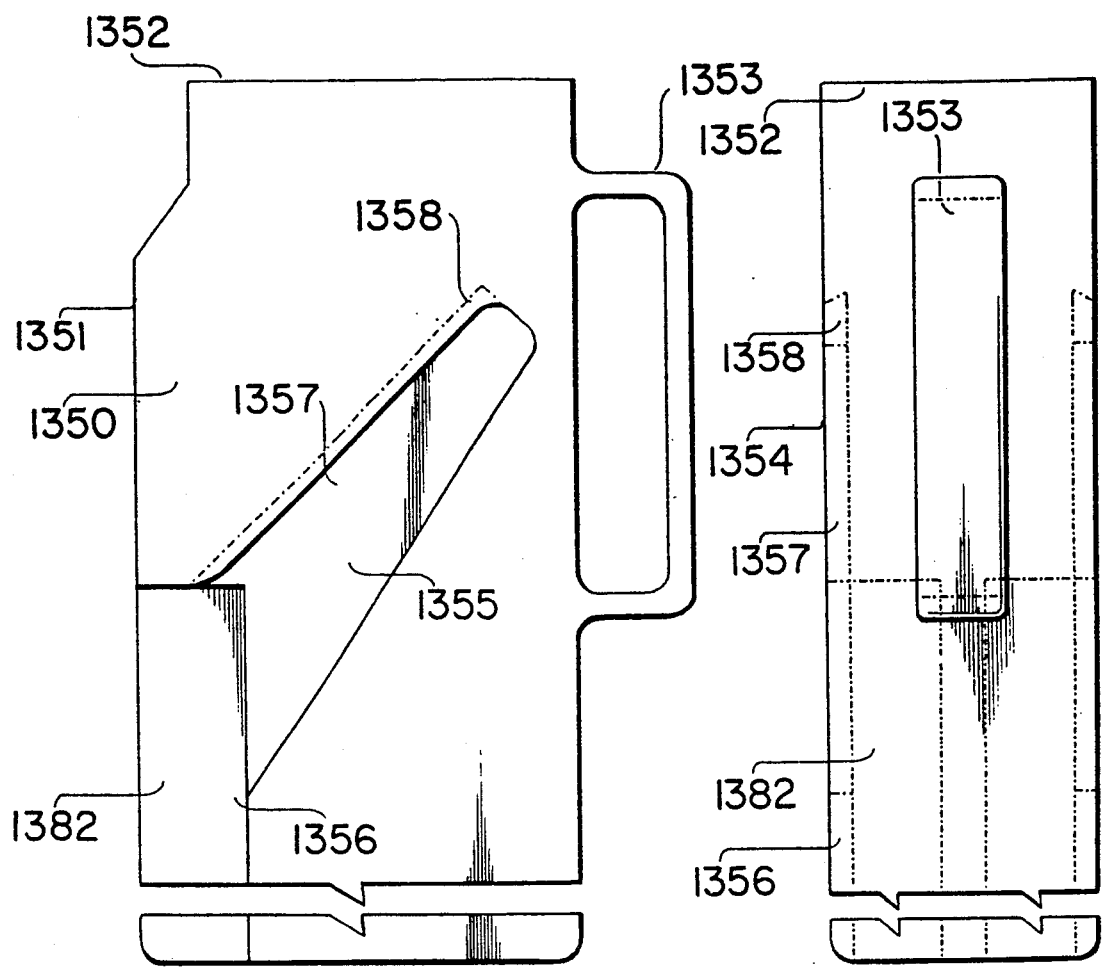
Figure 22:
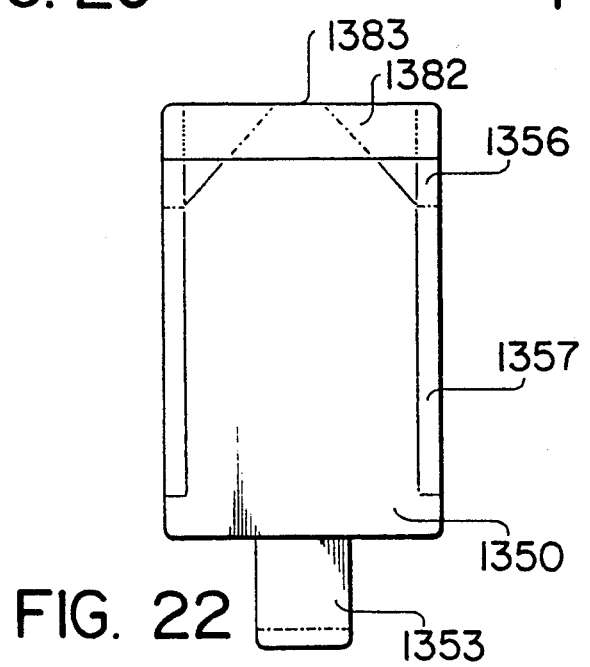

FIGS. 20, 21 and 22 show the construction of a typical canister 1350 for use in combination with the carrier 1311. Canister 1350 is generally box-shaped, in the form of a geometric figure referred to as a generally-rectangular parallelepiped, 1351, provided with an open top 1352 and a handle 1353. Each side wall 354 is provided with a depression 1355, in the form of a rectangular portion 1356 which is of tapered form from each side wall 1354 to the associated rear wall 1383, as shown at triangular sections 1382, (for ease of alignment, the side wall 1354 is not identical in shape as the lower portion 1322 of the support arm), and an upper diagonal slanted portion 1357 (of the same complementary shape, general size and orientation as the upper finger 1323). A guiding depression way 1358 is also provided in each wall 1354 of the same complementary shape, size and orientation as guiding edge 1325.

OPERATION OF PREFERRED EMBODIMENTS

(i) Operation of Embodiment of FIGS. 8, 9 and 10A–10C

In operation, the carrier 200 is secured to a frame member 230 of a bicycle (see FIG. 9) by means of screw securement through at least two of the holes 203 so that the inwardly toed flanges 204 contact the frame member 230, and so that its angularly-upwardly-projecting support arm 211 is exposed, and so that its gripping support means 205, 207 project outwardly from lateral side edges of the plate 201 of the carrier 200. The hood 220 is sprung so that it is in its outward or "ready" orientation.

To secure the bottle 300 to the carrier 200, the bottle 300 is mated with the carrier as follows: the alignment support means 211 is introduced into the female alignment means 312, and the support arm 211 is introduced into the deep well 312 of the bottle 300. The bottle 300 is urged angularly-downwardly. The locking tab means 205, thus mates with the female alignment means 318, within the side edges of the bottle 300 and the support arm 211 mates with the deep well 312 of the bottle 300. Reaction surface 313 of the bottle 300 engages the lower projecting chin 222 of the hood 220. Continued downward urging causes the lock tab 207 to clamp the bottle 300 to the carrier 200 by mating with depression 319 and places the sealing inner face 231 of the hood 220 into sealing engagement with the dispensing aperture 311 of the bottle 300. The bottle 300/carrier 200 combination is shown in FIGS. 8 and 9.

To remove the bottle 300 from the carrier 200, the opposite action, i.e. upward movement of the bottle 300 takes place. This is shown sequentially in FIGS. 8 and 10A–10C.

Another way of describing the operation of these embodiments is with reference to FIG. 9. The carrier 200 may be secured to a frame member 230 of a bicycle by screw securement through at least two of the holes 203 in the carrier base plate 201 so that the inwardly toed flanges 204 of the carrier contact the frame member and so that the alignment arm 211 projects angularly-upwardly. For proper operation, the carrier must be secured in a position on the bicycle frame so that the support arm is exposed. Once so secured, the gripping support walls 205 project outwardly from lateral side edges of the base plate 201 of the carrier 200.

Figure 8:
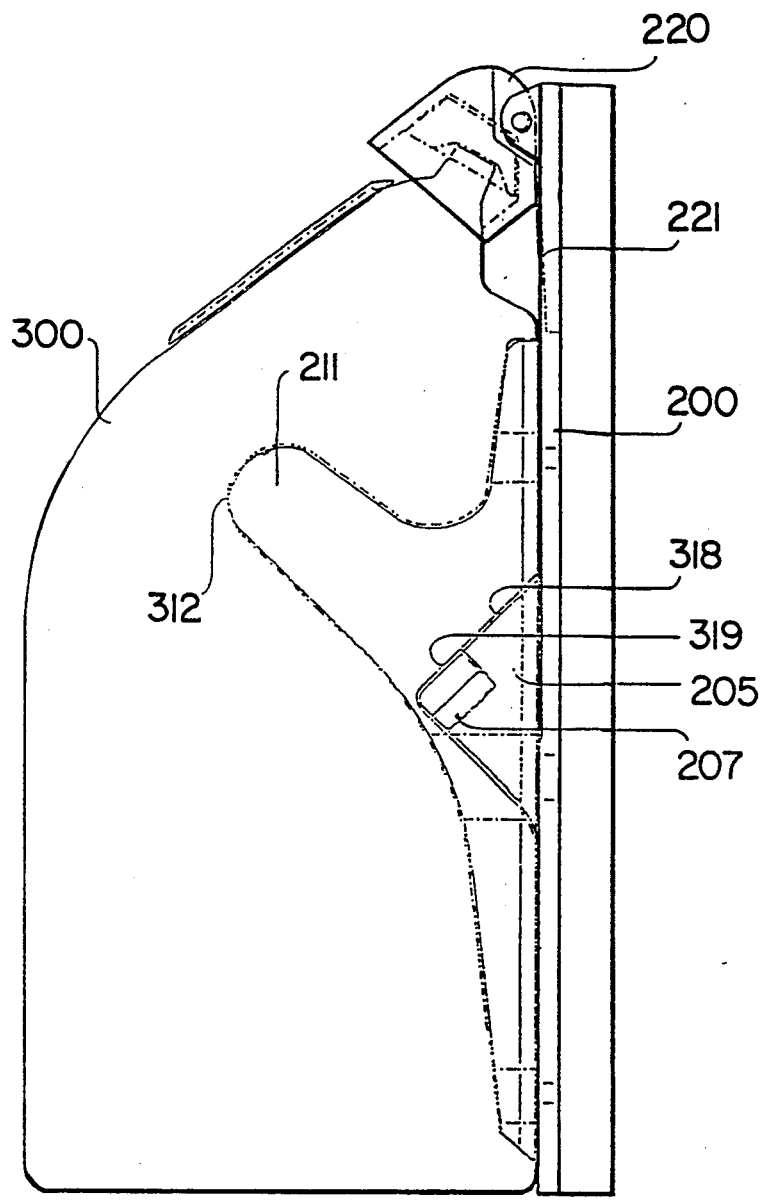
FIG. 8 is a side elevational view of the bottle/carrier combination of one embodiment of this invention.
Figure 6:
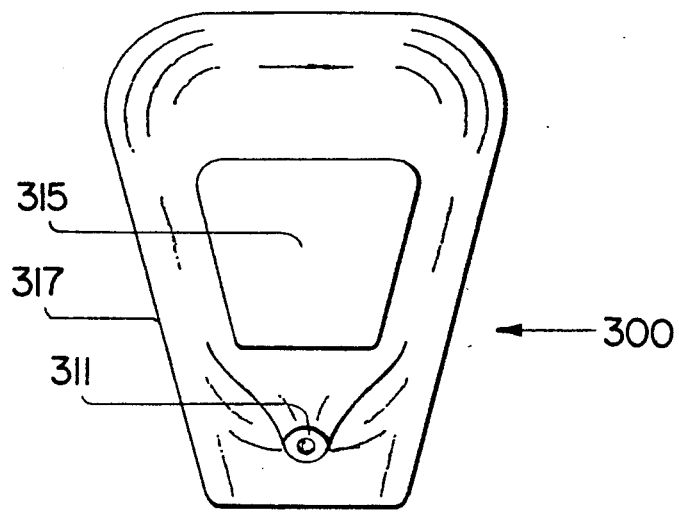
FIG. 6 is a top plan view of the bottle of FIG. 4.
Figure 10:
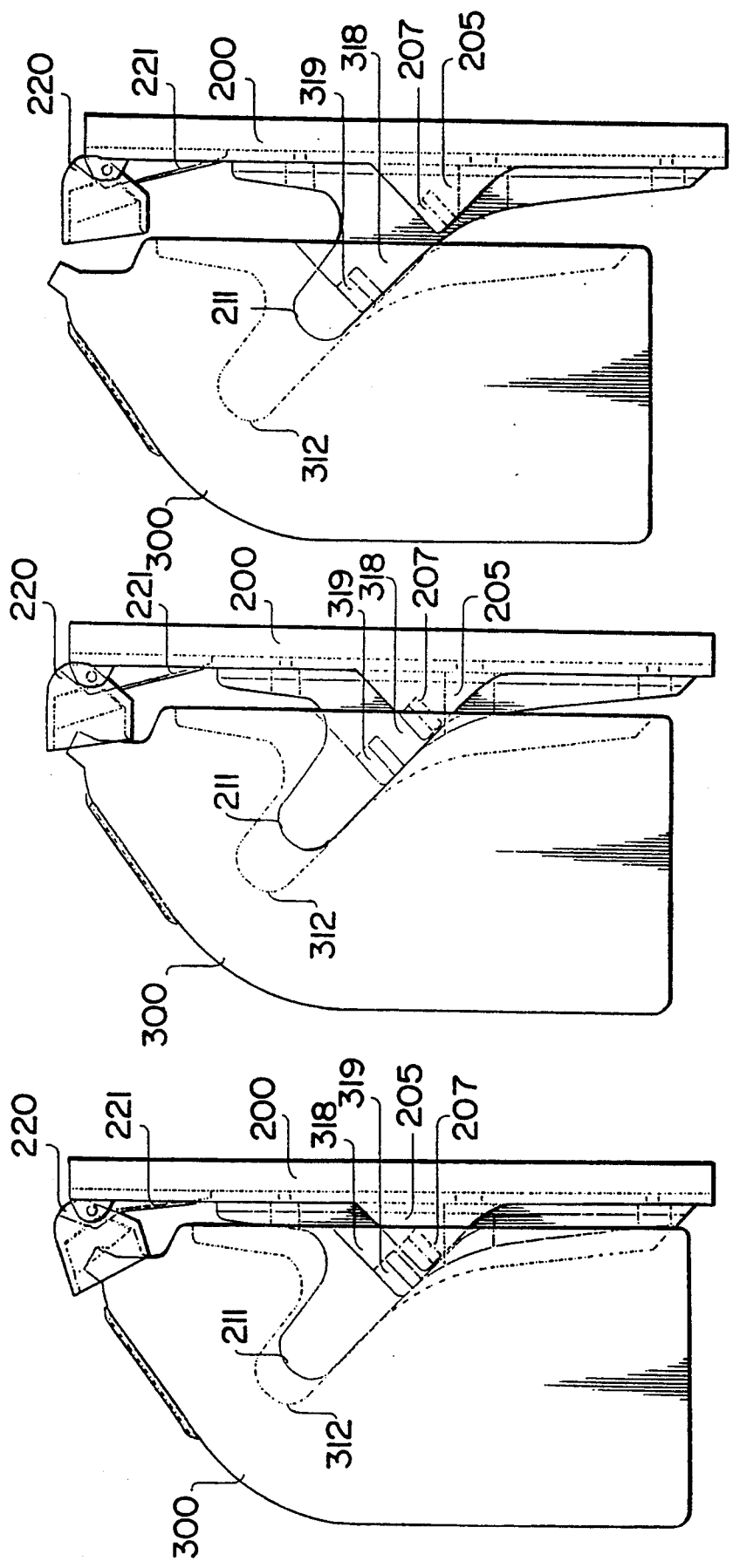
FIGS. 10A-10C are sequential side elevational views of the bottle/carrier combination of FIG. 9 showing the removal of the bottle from the carrier.
Figure 11:
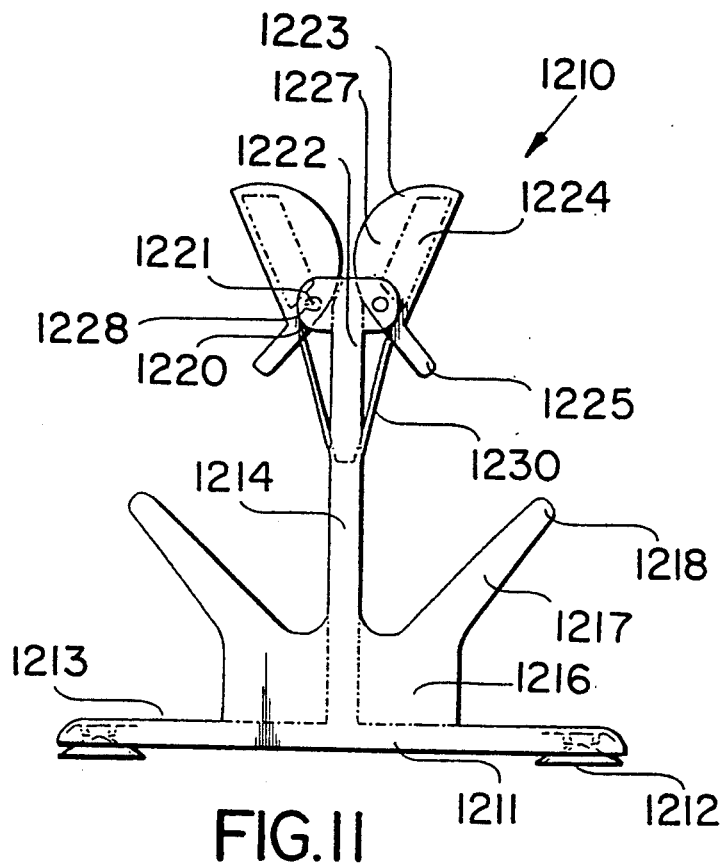

With reference to FIGS. 8 and 10A to 10C, in order to secure a bottle 300 to the carrier 200, the hood 220 must be sprung so that it is in its outwardly facing "ready" orientation illustrated in FIG. 10C. The bottle may then be mated with the carrier as follows. The alignment arm 211 of the carrier is introduced into the deep well 312 of the bottle (FIG. 10A). As the bottle is moved angularly-downwardly guided by the alignment arm, the gripping support walls 205 are introduced into the indentations 318. Continued downward urging of the bottle causes the reaction surface 313 of the bottle to first abut the lower projection chin 222 of the hood 220 (FIG. 10B) and then deflect the hood against the urging of spring 221 (FIG. 10C). Further downward urging of the bottle causes the gripping tabs 207 of the gripping support walls 205 to snap into the notches 319 in the bottle in order to lock the bottle in position on the carrier. Simultaneously, the reaction surface 313 of the bottle pushes the hood 220 to its closed position in sealing engagement with the dispensing aperture 311 of the bottle 300 (FIG. 8).

To remove the bottle from the carrier, the sequence of events is reversed, as shown sequentially by FIGS. 8 and 10A through 10C.

In the embodiment shown in FIG. 1A and FIG. 2A, the operation of the alignment arm 211 and the well 312 is the same. The resilient block 403 attached to the angularly-upwardly-projecting closure surface 401 contacts the spout opening 311 of the bottle as the bottle is urged downwardly, thereby creating sealed closure. The removal of the bottle is achieved by following the reverse steps.

Figure 16:
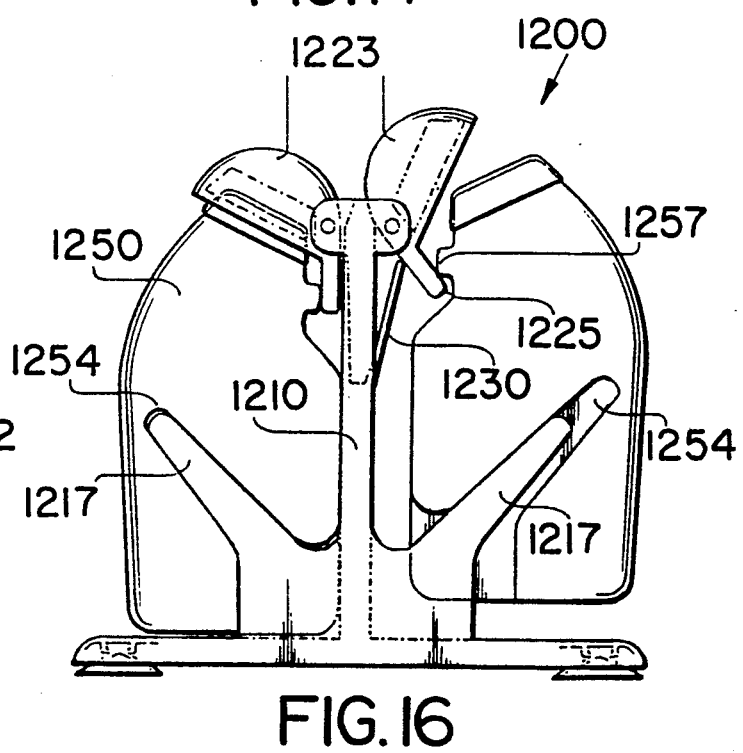

(ii) Operation of Embodiment of FIG. 16

The operation of this second embodiment of this invention is substantially the same as the operation of the first embodiment of the invention previously described. Thus, the depressed faces 1254 of the shaker 1250 are aligned between the support arms 1217 of the carrier 1210 and downward pressure is initiated. At this time the protrusion 1257 on the shaker 1250 engages the depending arm 1225 on the cap 1223 to urge the cap 1223 downwardly against the action of the spring 1230. The downward pressure is continued until the well 1255 of the shaker 1250 to grip the shaker 1250. At this time the cap 1223 is in its over-center, fully down and sealed orientation, as seen in the left-hand side of FIG. 16. The right-hand side of FIG. 16 shows the shaker 1250 either in its starting position for securement to the carrier 1210, or in its final position prior to its removal from the carrier 1210.

(iii) Operation of Embodiment of FIGS. 23 and 24A–24C

Figure 23:
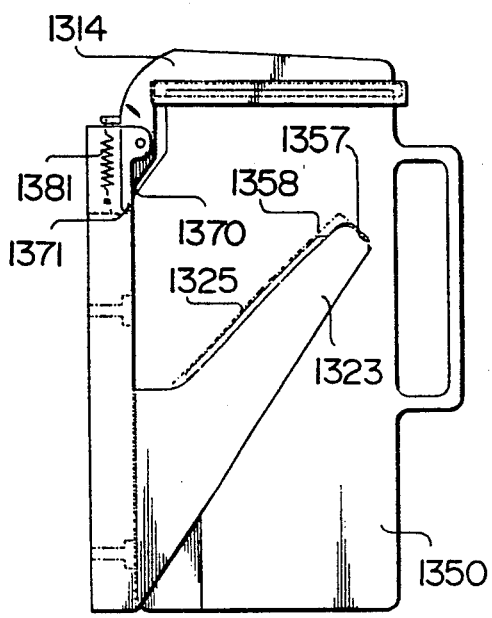

The operation of this third embodiment of this invention is substantially the same as the operation of the first and second embodiments of the invention previously described. Thus, the depressed faces 1356, 1357 of the canister 1350 are aligned between the support arms 1313 of the carrier 1310 and downward pressure is initiated. At this time, the reaction face 1370 on the canister 1350 engages the depending lever 1371 on the lid 1314 to urge the lid 1314 downwardly against the action of the spring 1381. The downward pressure is continued as the guiding edge 1325 of the carrier 1310 enters the shallow ways 1358 of the canister 1350. This is seen in FIG. 23.

Figure 24A:
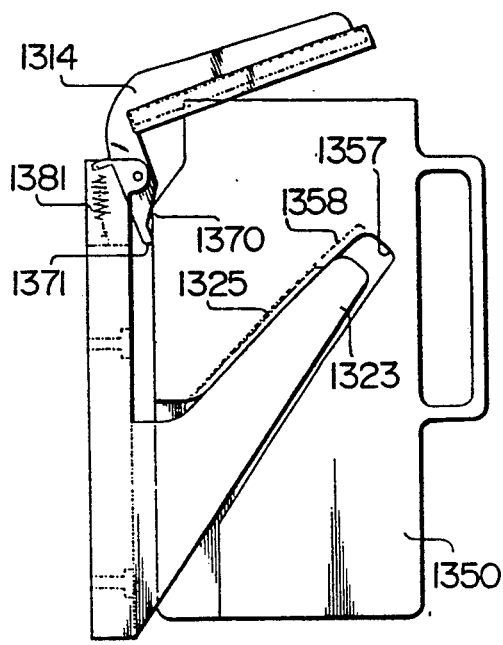
Figure 24B:
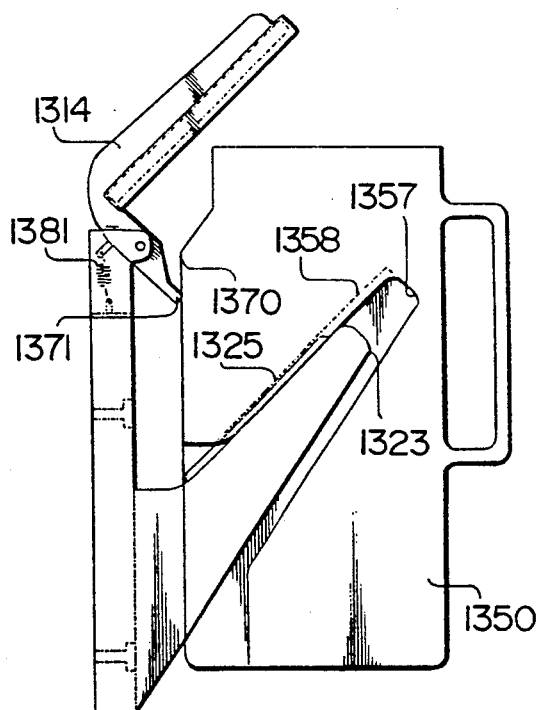
Figure 24C:
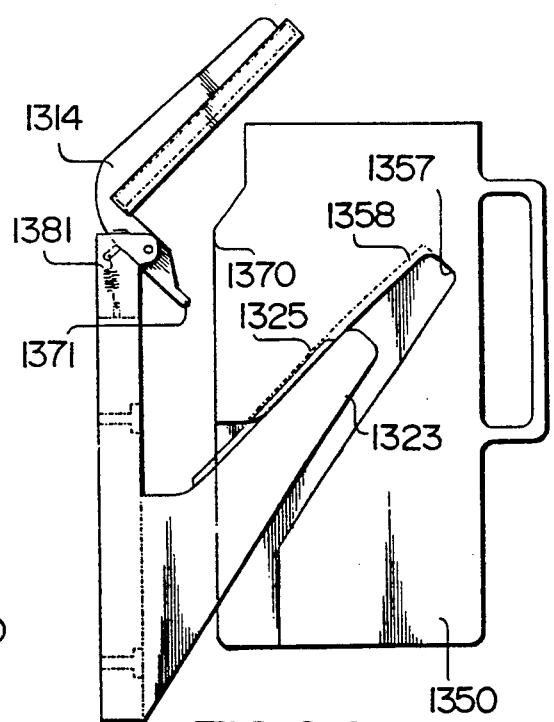

FIGS. 24A-24C show the sequential movement of the withdrawal of the canister 1350 from the carrier 1310. The tapered portion 1382 of the channel 1357 provides ease of alignment. Mechanical stop 1385 provides for the open position of the lid 1314.

Conclusion

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. A bottle and carrier combination for use on a bicycle, said carrier comprising: a base for securement to a selected surface of a bicycle frame, said base including a support arm projecting angularly from said base; laterally-spaced gripping members co-operatively associated with said support arm and projecting from said base; and an upper, pivotally-mounted, resiliently-biased hood; and said bottle comprising: an internal closed-ended pocket which is open at one face of said bottle, said pocket being of a complementary shape, size and location as, and being adapted to mate with, said support arm; said bottle also including female grippable depressions located in an exterior of said receptacle, said depressions being of a complementary shape, size and location as, and adapted to mate with, said laterally-spaced gripping members; and an opening located in said bottle, said opening being adapted to be sealed upon fitment of said bottle with respect to said carrier by pivoting of said resiliently-biased hood with respect to said carrier upon placement of said bottle on said carrier.

2. The bottle and carrier combination of claim 1, wherein said carrier comprises: a base for securement to a selected surface of a bicycle frame, said base comprising: a central support arm projecting angularly from said base, laterally-spaced gripping members co-operatively associated with said central support arm and projecting from said base, and an upper, pivotally-mounted, resiliently-biased hood; and wherein said bottle comprises: a central internal, closed-ended pocket which is open at one face of said bottle, said pocket being of the complementary shape, size and location, as and being adapted to mate with, said central support arm; said bottle also including laterally-spaced female grippable depressions located in the exterior of the bottle, said depressions being of the complementary shape, size and location as, and adapted to mate with, said gripping members; and an opening located in said bottle said opening being adapted to be sealed upon fitment of said bottle with respect to said carrier by pivoting of said resiliently-biased hood with respect to said carrier upon placement of said bottle on said carrier.

3. The combination of claim 2 wherein said support arm projecting from said mount is of generally oval cross-section.

4. The combination of claim 3 wherein said support arm projecting from said mount includes a wide lower body portion converging to a narrower free end portion.

5. The combination of claim 2 wherein said gripping members located on said mount comprise a pair of longitudinally-spaced-apart upstanding walls, each wall being laterally-spaced from said central support arm.

6. The combination of claim 5 wherein said longitudinally-spaced-apart upstanding walls have a generally rectangular cross-section, and have a triangular side elevational appearance.

7. The combination of claim 6 wherein each said upstanding wall includes laterally situated gripping members which face inwardly towards one another, for frictionally gripping said depressions in said bottle when said bottle is impaled on said support arm.

8. The combination of claim 7 wherein said gripping members each comprise a rhomboidally-shaped projection on an associated said upstanding wall, said projections facing inwardly towards one another, for frictionally gripping depressions in said bottle.

9. The combination of claim 2 wherein said pivotally-mounted, resiliently-biased hood is spring-biased by means of co-operation with at least one spring tension member.

10. The combination of claim 9 wherein said spring member has been formed with the base of said carrier.

11. The combination of claim 9 wherein said hood is pivotally-mounted between a pair of support risers projecting from said base of said carrier.

12. The combination of claim 11 wherein said pivotal mounting is by means of spaced-apart pins on said hood, said pins fitting into pivot wells in said support risers.

13. The combination of claim 11 wherein said pivotal mounting is by means of a pin passing through aligned apertures in said hood and in said support risers.

14. The combination of claim 9 wherein said spring member is mounted to the base of said carrier.

15. The combination of claim 2 wherein said actuating pivoting is achieved by means of a hood closing member on said hood, said hood closing member cooperating with, and contacting, a manually-moved closing surface on said bottle.

16. The combination of claim 2 wherein said base includes a lower face, said lower face of said base being provided with a pair of inwardly directed, bicycle-frame-contacting flanges.

17. The combination of claim 2 wherein said bottle is an aerodynamically-shaped bottle.

18. The combination of claim 2 wherein said internal pocket of said bottle includes a wide inlet portion converging to a narrower, closed-end, portion.

19. The combination of claim 2 wherein said female grippable depressions comprise a pair of longitudinally-spaced-apart shallow pockets, each pocket being laterally-spaced from said internal pocket.

20. The combination of claim 19 wherein said shallow pockets include a base and rhomboidally-shaped internal depressions extending internally from said base.

21. The combination of claim 2 wherein said bottle includes a manually-openable filling aperture as well as an automatically openable and closable outlet aperture.

22. For use in combination with a mount, a receptacle provided with an internal, closed-ended pocket which is open at one face of said receptacle said pocket being adapted to co-operate with, and to mate with, a support arm on said mount, a pair of laterally-spaced grippable depressions located in an exterior of said receptacle, said depression being adapted to be gripped by laterally-spaced gripping members on said mount, and an opening located in said receptacle, said opening being adapted automatically to be sealed by means of a resiliently-biased closure on said mount.

23. The receptacle of claim 22 wherein: said receptacle is provided with a centrally-positioned, internal, closed-ended pocket which is open at one face of said receptacle said pocket being adapted to co-operate with, and to mate with, a centrally-positioned support arm; and wherein said receptacle includes a pair of laterally-spaced grippable depressions located in the exterior of said receptacle, said grippable depressions being adapted to be gripped by laterally-spaced gripping members on said mount, and an opening located in said receptacle, said opening being adapted automatically to be sealed by actuated pivoting of a resiliently-biased closure on said mount.

24. A receptacle and mount combination, said mount comprising: a base for securement to a selected surface, said base including a support arm projecting angularly from said base; laterally-spaced gripping members co-operatively associated with said support arm and projecting from said base; and an upper, resiliently-biased closure; and said receptacle including an internal, closed-ended pocket which is open at one face of said receptacle, said pocket being adapted to co-operate with, and to mate with, said support arm, said receptacle also being provided with laterally-spaced grippable depressions located in an exterior of said receptacle, and an opening located in said receptacle, said opening being adapted automatically to be sealed upon fitment of said receptacle with respect to said mount by means of said resiliently-biased closure means on said mount.

25. The receptacle and mount combination of claim 24 wherein said mount includes: a base for securement to a selected surface, said base including a central support arm projecting angularly from said base, laterally-spaced gripping members co-operatively associated with said central support arm and projecting from said base, and an upper, pivotally-mounted, resiliently-biased closure; and wherein said receptacle includes a central, internal, closed-ended pocket which is open at one face of said receptacle, said pocket being adapted to co-operate with, and to mate with, said central support arm, said receptacle including laterally-spaced grippable depressions, and an opening located in said receptacle, said opening being adapted automatically to be sealed upon fitment of said receptacle with respect to said mount by pivoting of said resiliently-biased closure with respect to said mount.

* * * * *